UNITED STATES PATENT OFFICE.

ALFRED THAUSS, OF ELBERFELD, GERMANY, ASSIGNOR TO FARBENFABRIKEN VORM. FRIEDR. BAYER & CO., OF ELBERFELD, GERMANY, A CORPORATION OF GERMANY.

BLUE SULFUR DYE.

1,081,638.     Specification of Letters Patent.     Patented Dec. 16, 1913.

No Drawing.     Application filed May 22, 1912. Serial No. 698,941.

*To all whom it may concern:*

Be it known that I, ALFRED THAUSS, doctor of philosophy, chemist, citizen of the German Empire, residing at Elberfeld, Germany, have invented new and useful Improvements in Blue Sulfur Dye, of which the following is a specification.

I have found that new and valuable sulfid colors can be obtained by treating with alkali polysulfids the indophenols produced by joint oxidation of a nitrosophenol and diarylamin-ortho-carboxylic acids in which the aryl group which does not contain the carboxylic group has no substituent in the para-position. They are after being dried and pulverized dark powders soluble in a solution of sodium sulfid generally with a blue coloration and in concentrated sulfuric acid generally with a green to blue coloration. They are distinguished by their good solubility and they produce pure blue shades fast to washing. Instead of the indophenols leucoindophenols can be used.

In order to illustrate the new process more fully the following example is given, the parts being by weight:—32 parts of the leucoindophenol of the formula:

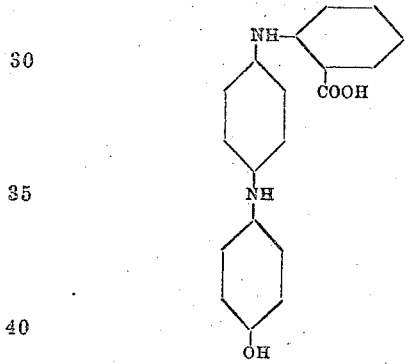

obtained from diphenylamin-ortho-carboxylic acid and nitrosophenol are dissolved in water with the aid of alkali and the solution is added to a polysulfid solution prepared from 100 parts of crystalized sodium sulfid and 60 parts of sulfur. Subsequently the mixture is evaporated until its boiling point is 112–113° C. When this point is reached it is further heated in a vessel provided with a reflux condenser for some hours until the parent material has disappeared. After the liquid has been evaporated the melt can be directly dried or subjected to purification. It dyes a blue.

I claim:—

1. The herein described new sulfur dyes being sulfur containing derivatives of indophenols derived from a nitrosophenol and diaryl-amin-carboxylic acids which are after being dried and pulverized dark powders, soluble in a solution of sodium sulfid generally with a blue coloration, soluble in concentrated sulfuric acid generally with a blue to green coloration; and dyeing unmordanted cotton blue shades, substantially as described.

2. The herein described new sulfur dye obtained from leucoindophenol of the formula:

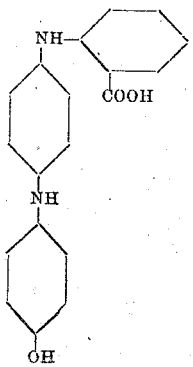

which is after being dried and pulverized a dark powder soluble in a sodium sulfid solution with a blue coloration and soluble in concentrated sulfuric acid with a greenish-black coloration; dyeing unmordanted cotton in pure blue shades fast to washing, substantially as described.

In testimony whereof I have hereunto set my hand in the presence of two subscribing witnesses.

ALFRED THAUSS. [L. S.]

Witnesses:
   HELEN NUFER,
   ALBERT NUFER.